Jan. 25, 1938. W. G. VOLLMER 2,106,367
MOTOR BLOCK STAND
Filed Aug. 21, 1936

INVENTOR.
Walter G. Vollmer.
BY
ATTORNEY.

Patented Jan. 25, 1938

2,106,367

UNITED STATES PATENT OFFICE 2,106,367

MOTOR-BLOCK STAND

Walter G. Vollmer, St. Louis, Mo., assignor to H & H Machine & Motor Parts Co., St. Louis, Mo., a corporation of Missouri Application August 21, 1936, Serial No. 97,198

1 Claim. (Cl. 29—89)

This invention relates generally to machine shop fixtures and, more particularly, to a certain new and useful improvement in fixtures of the type commonly known as stands for supporting the block of an internal combustion engine for and during repairs, for enabling convenient assembly of engine parts and appurtenances, and the like.

My invention has for its primary object the provision of a stand so constructed as to enable the operator with ease and facility to rotatably shift the supported motor or engine-block or other work as on a horizontal or vertical axis for selectively disposing the work for ready and convenient repair or other manipulation.

My invention has also for an object the provision of a stand of the type and for the purpose stated so further constructed as to permit the utilization of standard block bolt openings in quickly securing the block to the stand for repairs or other manipulation.

My invention has for an additional object the provision of a stand of the type and for the purpose stated which is relatively simple in structure, which may be economically manufactured, which is durable in use, which may be manipulated with minimum effort and labor, and which is efficient in the performance of its intended functions.

And with the above and other objects in view, my invention resides in the novel features of form, construction, arrangement, and combination of parts presently described and pointed out in the claim.

In the accompanying drawing,—

Figure 1:
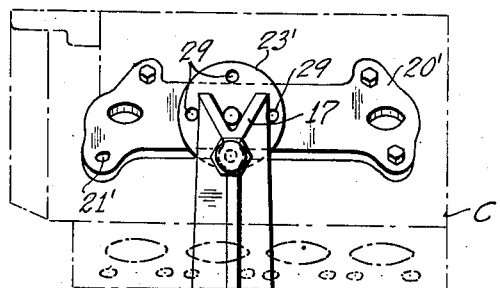
Figure 1 is a side elevational view, partly in section, of a motor-block stand constructed in accordance with and embodying my invention.
Figure 3:
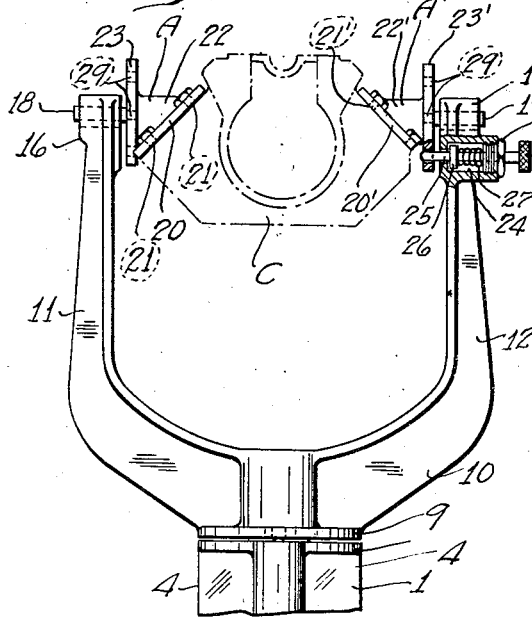
Figure 3 is a horizontal cross-sectional view of the stand taken approximately on the line 3—3, Figure 1.
Figure 3:
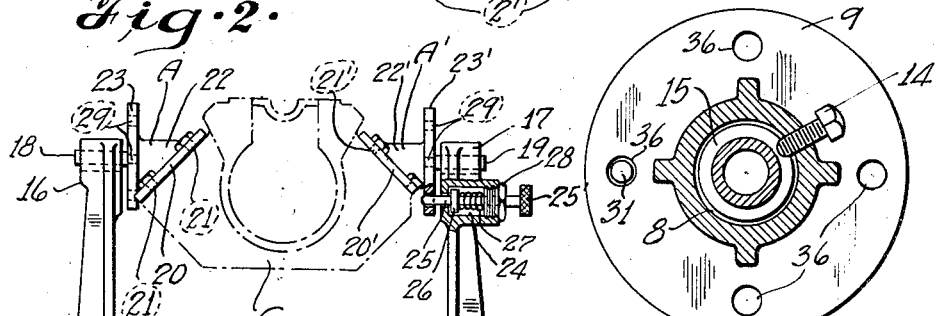

Referring now more in detail and by reference characters to the drawing, which illustrates a preferred embodiment of my invention, the stand includes an upstanding substantially cylindrical base 1 formed at its lower end with a foot flange 2 provided with any suitable number of openings 2' for accommodating retaining engagement with mounting screws of lugs seated in a concrete floor or other foundation structure, and formed at its upper end with a suitable mounting-shoulder 3, a plurality of preferably integral re-enforcing flanges or webs 4 extending longitudinally on base 1 intermediate the foot flange 2 and mounting-shoulder 3, as best seen in Figures 1 and 3.

Axially and centrally disposed in, and extending vertically upwardly from, the shoulder 3 of base 1, is a short bearing post 5, disposed upon the upper end of which is the lower race 6 of an anti-friction or ball-bearing assembly 7.

Having a suitably enlarged axially disposed recess, as at 8, in its bight to seat over and upon the post 5, and being provided on its under face with a so-called horizontal locking flange 9 overlying the base shoulder 3, is a yoke or frame 10 whose laterally spaced arms or tines 11, 12, are presented upwardly, as shown, the yoke 10 at its recess 8 being equipped with the cooperable upper race 13 of the ball-bearing assembly 7, so that the yoke 10 may with little friction turn or swivel, with the base-post 5 as a vertical axis, relatively to the base 1, a yoke-retaining screw 14 being disposed for threaded adjustment in a side wall of the recess 8 for loosely engaging an annular channel 15 in the post 5.

At their upper extremities, the yoke arms 11, 12, are respectively preferably integrally formed with V-blocks 16, 17, which are disposed along a single horizontal axial line, so as to provide a true horizontal axis for the spindles 18, 19, of work-engaging or mounting members A, A', respectively.

Forming part of the member A, is a suitably elongated plate 20 so angularly disposed with respect to the axis of spindle 18 to correspond with the standard angularity or inclination of, and to fit in use flatwise upon, a side-portion of a motor or cylinder block C, the plate 20 being further provided with a plurality of openings 21 so selectively positioned and arranged as to correspond with standard bolt openings provided in the standard cylinder block C.

Figure 2:
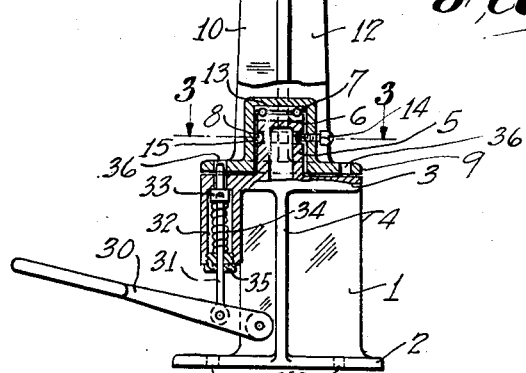
Figure 2 is a partially sectional end elevational view of the stand.

Preferably integrally formed with the plate 20, is a spindle bearing shoulder 22 having a vertically disposed locking flange 23, from which latter the spindle 18 outwardly projects, as best seen in Figure 2.

It may be stated that the motor mounting members A, A', should be designed in pairs for correspondingly engaging the usual "mirror-image" opposite sides of a cylinder block C. Accordingly, the motor engaging member A' likewise includes a cylinder block gripping plate 20' having a plurality of similarly disposed openings 21' and a similarly formed spindle bearing shoulder 22', which is, in turn, provided with a similarly vertically disposed locking flange 23', from which latter the spindle 19 outwardly projects, as also best seen in Figure 2.

While it is quite possible to provide a pair of motor mounting members or brackets A, A', for engaging a number of differently designed cylinder blocks C, it will be found desirable to provide a plurality of sets of motor mounting members A, A', to accommodate various types of cylinder blocks C, the present motor mounting members A, A', being designed more particularly for V-type cylinder blocks of the type commonly found in the more recent models of "Ford" automobiles. In this same connection, it will also be apparent that the positioning of the spindle bearing shoulders 22, 22', along the plates 20, 20', should take into account the particular type of cylinder block for which the member is being designed, so that the common axis of the spindles 18, 19, will pass through the center of gravity of the particular cylinder block.

Formed in the V-block 17 of the yoke-arm 12, is a recess 24, through which passes a longitudinally shiftable plunger pin 25 having a rigid shoulder 26 against which a spiral spring 27 at an end impinges to yieldingly urge the pin 25 longitudinally toward the vertical axis of the stand and away from a centrally bored externally threaded retaining nut 28, which is threadedly disposed as a closure over the outer end of the recess 24, as best seen in Figure 2. And disposed annularly about the vertical locking flange 23' is a series of openings 29 positioned for selective engagement with the inwardly extending end of the spring-pressed pin 25, which, for convenience, has an engaging grip 25'.

Pivotally connected at an end to one of the flanges 4 of the base 1 for limited rocking movement in a vertical plane, is a pedal 30, to which is pivotally attached the lower end of a locking pin 31 presented upwardly through a recess 32 formed in the body of the particular flange 4 for projection through a registering opening provided in the mounting flange 3. Mounted rigidly on the pin 31, is a collar 33, against which a spiral spring 34 at an end impinges to resiliently force the pin 31 upwardly away from a centrally bored externally threaded collar 35, which is threadedly disposed in the bottom open end of the recess 32. Annularly disposed about the lock flange 9, is a series of openings 36 positioned for selective engagement with the upwardly projecting end of the locking pin 31.

In use and operation, the motor engaging members A, A', are suitably mounted on the cylinder block C, which is indicated in dotted lines in Figures 1 and 2, the members A, A', being secured at their respective plates 20, 20', to the cylinder block C by bolts passed therethrough and engaging standard bolt openings in the cylinder block, the members A, A', being positioned over respectively similar bolt-openings on opposite sides of the motor block C, so that the axes of the spindles 18, 19, will lie in the same line. The cylinder block C, together with the members A, A', are lifted above the yoke arms 11, 12, and lowered therebetween until the spindles 18, 19, drop into the V-blocks or bearings 16, 17. To allow the spindle 19 to completely drop into operative position in the V-block 17, the plunger pin 25 is withdrawn momentarily to clear the lower end of the vertical locking flange 23'. The spindles 18, 19, being in operative position, the plunger pin 25 is released, whereupon pin 25 yieldingly moves inwardly toward the vertical axis of the fixture into frictional engagement with the outer face of the locking flange 23'. It will be apparent that, in such position, the cylinder block C may be rotated about the horizontal axis of the spindles 18, 19, the frictional engagement of the plunger pin 25 producing a certain amount of easily overcome resistance to rotation.

As soon as the cylinder block C has been rotated to a point at which one of the holes 29 in the vertical locking flange 23' is positioned opposite the pin 25, the pin 25 will move forwardly into locking engagement with the flange 23' and retain the block C from further rotation about the horizontal axis, further rotation of the block C, of course, being permitted on withdrawing the pin 25 from locking engagement with the particular opening 29. Thus, it will be evident that the block C may be rotated about the horizontal axis and retained at any position in which the pin 25 lockingly engages one of the openings 29, and it will further be apparent that the block C and mounting members A, A', are held in the V-blocks 16, 17, only by gravity and the interengagement of the pin 25 and one of the holes or openings 29.

When it is desired to rotate the cylinder block C in a horizontal plane, the pedal 30 may be depressed, thereby withdrawing the locking pin 31 from engagement with one of the openings 36 in the horizontal locking flange 9, whereupon the yoke 10 and block C, as a unit, may be rotated horizontally about the vertical axis of the stand or fixture. As the pedal 30 is released, the spring 34 will yieldingly shift the pin 31 upwardly into frictional engagement with the under surface of the flange 9, thereby creating a predetermined amount of frictional resistance to rotation. By choosing a spring 34 of suitable strength, practically any amount of frictional resistance may be secured, thereby holding the stand or fixture in any desired position of rotation about its vertical axis with any desired degree of rigidity. It will also be apparent that the yoke 10 may be secured in any position of rotation about its vertical axis at which one of the openings 36 is positioned over, and engaged with, the locking pin 31.

The present stand thus provides a machine shop fixture suitable for supporting cylinder blocks wherein the supported cylinder block may be freely rotated about a plurality of different axes, thereby permitting easy access thereto for repairs and for installation and assembly of various parts and appurtenances. In addition, the present stand provides a machine shop fixture in which the supported structure may be readily removed from the fixture and transferred to another part of the machine shop for subsequent operation without the necessity of completely dismantling the fixture.

It will be understood that changes and modifications in the form, construction, arrangement, and combination of the several parts of the fixture may be made and substituted for those herein shown and described without departing from the nature and principle of my invention.

Having thus described my invention, what I claim and desire to secure by Letters Patent is,—

A motor-block stand for supporting and holding a motor block to allow ready bodily placement and removal and to allow substantially universal movement of the supported block to give free and unobstructed access to all surfaces and cavities and openings requiring reconditioning, comprising in combination a base, a frame mounted on the base for revoluble movement on a substantially vertical axis, said frame including a pair of upwardly presented laterally spaced arms provided at their upper ends with open-topped axially aligned substantially V-shaped spindle receiving bearings, one of said arms having a transversely shiftable spring-pressed pin extending therethrough, a pair of companion motor engaging members each including as an integral structure a shank having at its one end an axially outwardly extending diametrically reduced spindle and at its other end a flat face plate extending laterally outwardly on each side of the shank and having a mounting face provided with a plurality of apertures in registration with standard openings in a motor block to be supported and being disposed in a plane at an oblique angle to the shank axis for detachable supporting connection with the standard openings on a motor block, and a transverse plate located concentrically of the shank intermediate its ends joining the shank with the spindle, said plate having an annular series of spaced apertures for selective position-determining engagement with the spring-pressed pin, said motor engaging members being thus bodily carried by and being movable with the motor block and having the spindles thereof in axial alignment on opposite sides of the motor block in laterally outwardly extending relation for rotative reception in the V-shaped spindle receiving bearings.

WALTER G. VOLLMER.